United States Patent
Chow et al.

(10) Patent No.: US 11,983,745 B2
(45) Date of Patent: May 14, 2024

(54) SYSTEMS AND METHODS FOR VALUATION OF A VEHICLE

(71) Applicant: Capital One Services, LLC, McLean, VA (US)

(72) Inventors: Chih-Hsiang Chow, Coppell, TX (US); Elizabeth Furlan, Plano, TX (US); Steven Dang, Plano, TX (US)

(73) Assignee: Capital One Services, LLC, McLean, VA (US)

(*) Notice: Subject to any disclaimer, the term of this patent is extended or adjusted under 35 U.S.C. 154(b) by 252 days.

(21) Appl. No.: 17/396,142

(22) Filed: Aug. 6, 2021

(65) Prior Publication Data

US 2023/0042156 A1    Feb. 9, 2023

(51) Int. Cl.
*G06Q 30/02* (2023.01)
*G06F 16/9535* (2019.01)
(Continued)

(52) U.S. Cl.
CPC ..... *G06Q 30/0278* (2013.01); *G06F 16/9535* (2019.01); *G06F 16/9538* (2019.01);
(Continued)

(58) Field of Classification Search
CPC ........... G06Q 30/0278; G06Q 30/0283; G06Q 30/0641; G06F 16/9535; G06F 16/9538; G06F 16/55; G06F 16/75; G06N 3/08; G06N 3/0442; G06N 3/0464; G06N 3/047; G06N 5/01; G06N 20/10; G06T 7/0002; G06T 2207/20084; G06T 2207/30252;
(Continued)

(56) References Cited

U.S. PATENT DOCUMENTS 9,747,481 B1 * 8/2017 Bondarenko ........ G06K 7/1413
9,824,453 B1 * 11/2017 Collins ................. G06V 20/20
(Continued)

OTHER PUBLICATIONS

Kim, Seungwook et al., "Churn prediction of mobile and online casual games using play log data,"—pp. 1-19, Jul. 5, 2017, Department of Transdisciplinary Studies, Seoul National University, Seoul, Republic of Korea.
(Continued)

*Primary Examiner* — Jonathan P Ouellette
(74) *Attorney, Agent, or Firm* — Banner & Witcoff, Ltd.

(57) ABSTRACT

Aspects described provide systems and methods that relate generally to image analysis and, more specifically, identifying individual components and elements in an image. The systems and methods include a valuation application executing one or more application program interfaces (APIs) communicating with one or more websites via a network, where the user is prompted to enter information and/or take pictures or videos of their vehicle that they would like to sell. The valuation application utilizes a machine learning model to identify and value the various vehicle components within the images and videos. Based on the machine learning model, the valuation application identifies each component according to the images and videos and performs a search to determine the value of the components identified. The valuation application tabulates and summarizes the vehicle component resale values and resell information for the user to view.

20 Claims, 4 Drawing Sheets

(51) Int. Cl.
   *G06F 16/9538* (2019.01)
   *G06N 3/08* (2023.01)
   *G06Q 30/0283* (2023.01)
   *G06Q 30/0601* (2023.01)
   *G06Q 40/00* (2023.01)
   *G06Q 50/16* (2012.01)
   *G06T 7/00* (2017.01)

(52) U.S. Cl.
   CPC ............ *G06N 3/08* (2013.01); *G06Q 30/0283* (2013.01); *G06Q 30/0641* (2013.01); *G06T 7/0002* (2013.01); *G06T 2207/20084* (2013.01); *G06T 2207/30252* (2013.01)

(58) Field of Classification Search
   CPC . G06T 2207/10016; G06T 2207/20076; G06T 2207/20081; G06T 7/00
   USPC .......................................... 705/1.1–912, 306
   See application file for complete search history.

(56) References Cited

U.S. PATENT DOCUMENTS

| | | | | |
|---|---|---|---|---|
| 10,108,989 | B2* | 10/2018 | Swinson | G06Q 30/02 |
| 10,572,944 | B1* | 2/2020 | Brandmaier | G06Q 40/08 |
| 11,410,287 | B2* | 8/2022 | Tian | G06T 7/0002 |
| 2010/0293181 | A1* | 11/2010 | Muller | G06F 16/245 707/708 |
| 2011/0313936 | A1* | 12/2011 | Sieger | G06Q 10/083 705/306 |
| 2016/0364783 | A1 | 12/2016 | Ramanuja et al. | |
| 2017/0270580 | A1 | 9/2017 | Esposito et al. | |
| 2018/0260793 | A1 | 9/2018 | Li et al. | |
| 2018/0350163 | A1* | 12/2018 | Pofale | G06Q 30/0283 |
| 2020/0065956 | A1 | 2/2020 | Shen et al. | |
| 2020/0097841 | A1* | 3/2020 | Petousis | H03M 7/6023 |
| 2020/0111170 | A1* | 4/2020 | Oldham | G06Q 30/0278 |
| 2020/0342478 | A1* | 10/2020 | Dalinina | G06Q 30/0631 |
| 2021/0116256 | A1* | 4/2021 | Konrardy | G05D 1/0287 |
| 2022/0138860 | A1* | 5/2022 | Chatfield | G06Q 40/08 705/4 |
| 2022/0335484 | A1* | 10/2022 | McCord | G07C 5/0816 |

OTHER PUBLICATIONS

Zhu, Pei-sheng et al., "Application of artificial neural networks for predicting the sound insulation of lightweight panel walls"—English Abstract, pp. 1-5, Nov. 4, 2006, College of Architecture & Urban Planning, Tongji University, Shanghai 200092, China.

Harahap, Fitriana et al., "Implementation of Naive Bayes Classification Method for Predicting Purchase,"—pp. 1-6, The 6th International Conference on Cyber and IT Service Management (CITSM 2018) Inna Parapat Hotel—Medan, Aug. 7-9, 2018. Faculty of Engineering and Computer Science, Universitas Potensi Utama, JL. K.L. Yos Sudarso KM. 6, 5 No. 3 A—Medan, 20241 Indonesia.

Aliev, Rafik A., et al., "Type-2 fuzzy neural networks with fuzzy clustering and differential evolution optimization,"—pp. 1-18, Jan. 1, 2011, www.elsevier.com/locate/ins.

Taylor, Brian J., "Methods and Procedures for the Verification and Validation of Artificial Neural Networks," pp. 1-280, copyright 2006, Institute for Scientific Research, Inc.

Leser, Christoph et al., "Accurate shock absorber load modeling in an all terrain vehicle using black box neural network techniques,"—pp. 1-10, copyright 2002, Society of Automative Engineers, Inc.

Yang, Kwang-Tzu, "Artificial neural networks (ANNS) a new paradigm for thermal science and engineering," pp. 1-19, Journal of Heat Transfer, Sep. 2008, vol. 130, Department of Aerospace and Mechanical Engineering, University of Notre Dame, Notre Dame, IN 46556.

Yin, Han et al., "A network-enhanced prediction method for automobile purchase classification using deep learning," pp. 1-16, Jun. 26, 2018, Pacific Asia Conference on Information Systems (PACIS), Renmin University of China, No. 59 Zhongguancun Street Haidian District, Beijing, 100872, P.R. China.

Burnap, Alex et al., "Improving design preference prediction accuracy using feature learning," pp. 1-12, Journal of Mechanical Design, Jul. 2016, vol. 138, University of Michigan, Ann Arbor, MI 48109.

* cited by examiner

SYSTEMS AND METHODS FOR VALUATION OF A VEHICLE

FIELD OF USE

Aspects of the disclosure relate generally to image analysis and, more specifically, identifying individual components and elements in an image.

BACKGROUND

When determining to sell a vehicle, a vehicle owner will traditionally either go to a dealership to perform a trade-in or try to sell the vehicle via various resell vehicle websites, such as Carguru or Craigslist. The valuation mechanism for the vehicle that is typically used is a service such as Kelly Blue Book, which asks general questions about one or more of the following: make/model, year, color, mileage, features, accessories and/or vehicle condition. Another way of determining the value of the vehicle is to identify the various components of the vehicle that the vehicle can be separated into and resold on the market. Various solutions currently in the art, such as car-parts.com, require a large database of historical vehicle inventory and/or historical vehicle component inventory and that provide a limited assessment of the current vehicle component marketplace.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein allow for performing image analysis to determine and identify the various components for the resale of a vehicle. The systems and methods may include a valuation application connected via a network to one or more application program interfaces (APIs) communicating with one or more websites, where the user is prompted to enter information and/or take pictures or videos of their vehicle that they would like to sell. The valuation application may utilize a machine learning model to identify and value the various vehicle components within the images and videos. Using the images and videos of the vehicle and/or vehicle components, the machine learning model outputs and identifies each component according to the images and videos and performs a search to determine the value of the components identified. The valuation application may then tabulate and summarize the vehicle component resale values and resell information for the user to view.

More particularly, some aspects described herein may provide a computing device that may comprise: a display with a user interface; a camera; one or more processors; and memory storing instructions. The memory storing instructions, when executed by the one or more processors, may cause the computing device to receive, via the user interface from a user, vehicle information regarding a resale of a vehicle. The memory storing instructions, when executed by the one or more processors, may also cause the computing device to cause, responsive to a user selection on the user interface, the camera to capture one or more of the following: a plurality of images of a vehicle or one or more videos of the vehicle. The memory storing instructions, when executed by the one or more processors, may cause the computing device to receive, via the camera, the plurality of images of the vehicle or the one or more videos of the vehicle. The memory storing instructions, when executed by the one or more processors, may cause the computing device to train, by the one or more processors, a machine learning model for identifying a plurality of vehicle components of the vehicle based on the plurality of images or the one or more videos of the vehicle. The memory storing instructions, when executed by the one or more processors, may cause the computing device to query, via a vehicle component reseller application programming interface (API), one or more vehicle component reseller websites and to determine, based on querying the one or more vehicle component reseller websites, a resale value for each of the plurality of vehicle components. The memory storing instructions, when executed by the one or more processors, may cause the computing device to receive, via the vehicle component reseller API, the resale value for each of the plurality of vehicle components. The training of the machine learning model may include analyzing, using the machine learning model, the plurality of images or the one or more videos of the vehicle; and identifying, using the machine learning model, a plurality of vehicle components of the vehicle based on the plurality of images or the one or more videos of the vehicle. The trained machine learning model may be configured to determine a pattern of the plurality of images or the one or more videos of the vehicle associated with one or more of the plurality of vehicle components of the vehicle that indicates a potential correlation between the plurality of images or the one or more videos of the vehicle and one or more of the plurality of vehicle components of the vehicle. Additionally, the vehicle information may include at least one of: a vehicle make, a vehicle model, or a vehicle year.

According to some embodiments, the instructions, when executed by the one or more processors, may cause the computing device to prompt, via the user interface, the user to input the vehicle information regarding the resale of the vehicle. In another embodiment, the instructions, when executed by the one or more processors, may cause the computing device to query, via a vehicle manufacturer API and based on the vehicle information, one or more vehicle manufacturer websites; determine, based on querying the one or more vehicle manufacturer websites, a vehicle component list that includes the plurality of vehicle components associated with the vehicle information; and receive, via the vehicle manufacturer API, the vehicle component list. The resale value may include at least one of: a minimum resale value, a maximum resale value, or an average resale value. In another embodiment, the instructions, when executed by the one or more processors, may cause the computing device to: display, via the user interface and for each of the plurality of vehicle components, an individualized image of each of the plurality of vehicle components with the resale value associated with each of the plurality of vehicle components. In yet another embodiment, the instructions, when executed the one or more processors, may cause the computing device to provide at least one of: a vehicle resale value for the vehicle for selling the vehicle to a dealership; a component resale value for selling the plurality of vehicle components to a parts shop, the component resale value being an aggregation of the resale value for each of the plurality of vehicle components; or a scrap metal value for selling the vehicle for scrap metal. According to some embodiments, the instructions, when executed by the one or more processors, may cause the computing device to prompt, via the user interface, the user to capture additional images or videos, using the camera, of one or more of the plurality of vehicle components based on a request for additional information. In another embodiment, the instructions, when executed by the one or more processors, may cause the computing device to determine, via the vehicle component reseller API, a damage deduction for each of the plurality of vehicle components. In yet another embodiment, the instructions, when executed by the one or more processors, may cause the computing device to determine, via the vehicle component reseller API, an age deduction for each of the plurality of vehicle components.

Additionally, other aspects described herein provide a computer-implemented method that may comprise displaying, on a display of a computing device, a user interface; prompting, via the user interface, a user to input vehicle information regarding a resale of a vehicle; and receiving, via the user interface from the user. The vehicle information may include at least one of: a vehicle make, a vehicle model, or a vehicle year. The method may also include querying, via a vehicle manufacturer application programming interface (API) and based on the vehicle information, one or more vehicle manufacturer websites; determining, based on querying the one or more vehicle manufacturer websites, a vehicle component list; and receiving, by the computing device via the vehicle manufacturing API, the vehicle component list. The method may also include causing, responsive to a user selection on the user interface, a camera connected to the computing device, to capture one or more of the following: a plurality of images of the vehicle or one or more videos of the vehicle and receiving, via the camera, the plurality of images or the one or more videos of the vehicle. The method may also include training, by the one or more processors, a neural network or machine learning model for identifying the plurality of vehicle components of the vehicle based on the plurality of images or one or more videos of the vehicle. The method may also include querying, via a vehicle component reseller API, one or more vehicle component reseller websites and determining, based on querying the one or more vehicle component reseller websites, a real-time resale value for each of the plurality of vehicle components. The method may also include receiving, via the vehicle component reseller API, the real-time resale value for each of the plurality of vehicle components and displaying, via the user interface and for each of the plurality of vehicle components, a vehicle component resale value table. The vehicle component resale value table may include each of the plurality of vehicle components, the minimum resale value, the maximum resale value, and the average resale value associated with each of the plurality of vehicle components. The training of the neural network or machine learning model may include analyzing, using the neural network or machine learning model, the plurality of images or the one or more videos of the vehicle; and identifying, using the neural network or machine learning model, the plurality of vehicle components of the vehicle based on the plurality of images or the one or more videos of the vehicle. The neural network or machine learning model may be configured to determine a pattern of the plurality of images or the one or more videos of the vehicle associated with one or more of the plurality of vehicle components of the vehicle that indicates a potential correlation between the plurality of images or the one or more videos of the vehicle and one or more of the plurality of vehicle components of the vehicle. Additionally, the vehicle component list may include a plurality of vehicle components associated with the vehicle information. Further, the real-time resale value may include a minimum resale value, a maximum resale value, and an average resale value.

Additionally, other aspects described herein may provide one or more non-transitory media storing instructions that, when executed by one or more processors, may cause a computing device to perform steps comprising: displaying, on a display of the computing device, a user interface; prompting, via the user interface, a user to input vehicle information regarding a resale of a vehicle; and receiving, via the user interface, the vehicle information. The vehicle information may include a vehicle make, a vehicle model, and a vehicle year. The steps may also include querying, via a vehicle manufacturer application programming interface (API) and based on the vehicle information, one or more vehicle manufacturer websites; determining, based on querying the one or more vehicle manufacturer websites, a vehicle component list; and receiving, by the computing device via the vehicle manufacturing API, the vehicle component list. The steps may also include prompting, via the user interface, the user to capture one or more of the following: a plurality of images of a vehicle or one or more videos of the vehicle; causing, responsive to the user selection on the user interface, a camera on the computing device, to capture the plurality of images or the one or more videos of the vehicle and receiving, via the camera, the plurality of images or the one or more videos of the vehicle. The steps may also include training, by the one or more processors, a neural network or machine learning model for identifying the plurality of vehicle components of the vehicle based on the plurality of images or one or more videos of the vehicle. The steps may also include querying, via a vehicle component reseller API, one or more vehicle component reseller websites; determining, based on querying the one or more vehicle component reseller websites, a real-time resale value for each of the plurality of vehicle components and receiving, via the vehicle component reseller API, the real-time resale value for each of the plurality of vehicle components. The steps may also include displaying, via the user interface and for each of the plurality of vehicle components, a vehicle component resale value table; displaying, via the user interface and for each of the plurality of vehicle components, an individualized image of each of the plurality of vehicle components with the minimum resale value, the maximum resale value, and the average resale value associated with each of the plurality of vehicle components. The steps may also include providing, by the computing device, a vehicle resale value for the vehicle for selling the vehicle to a dealership, a component resale value for selling the vehicle components to a parts shop, and a scrap metal value for selling the vehicle for scrap metal. Further, the training of the neural network or machine learning model may include analyzing, using the neural network or machine learning model, the plurality of images or the one or more videos of the vehicle; and identifying, using the neural network or machine learning model, the plurality of vehicle components of the vehicle based on the plurality of images or the one or more videos of the vehicle. The neural network or machine learning model may be configured to determine a pattern of the plurality of images or the one or more videos of the vehicle associated with one or more of the plurality of vehicle components of the vehicle that indicates a potential correlation between the plurality of images or the one or more videos of the vehicle and one or more of the plurality of vehicle components of the vehicle. Additionally, the vehicle component list may include a plurality of vehicle components associated with the vehicle information. Further, the real-time resale value may include a minimum resale value, a maximum resale value, and an average resale value. Additionally, the vehicle component resale value table may include each of the plurality of vehicle components, the minimum resale value, the maximum resale value, and the average resale value associated with each of the plurality of vehicle components. Further, the component resale value may be an aggregation of the real-time resale value for each of the plurality of vehicle components.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
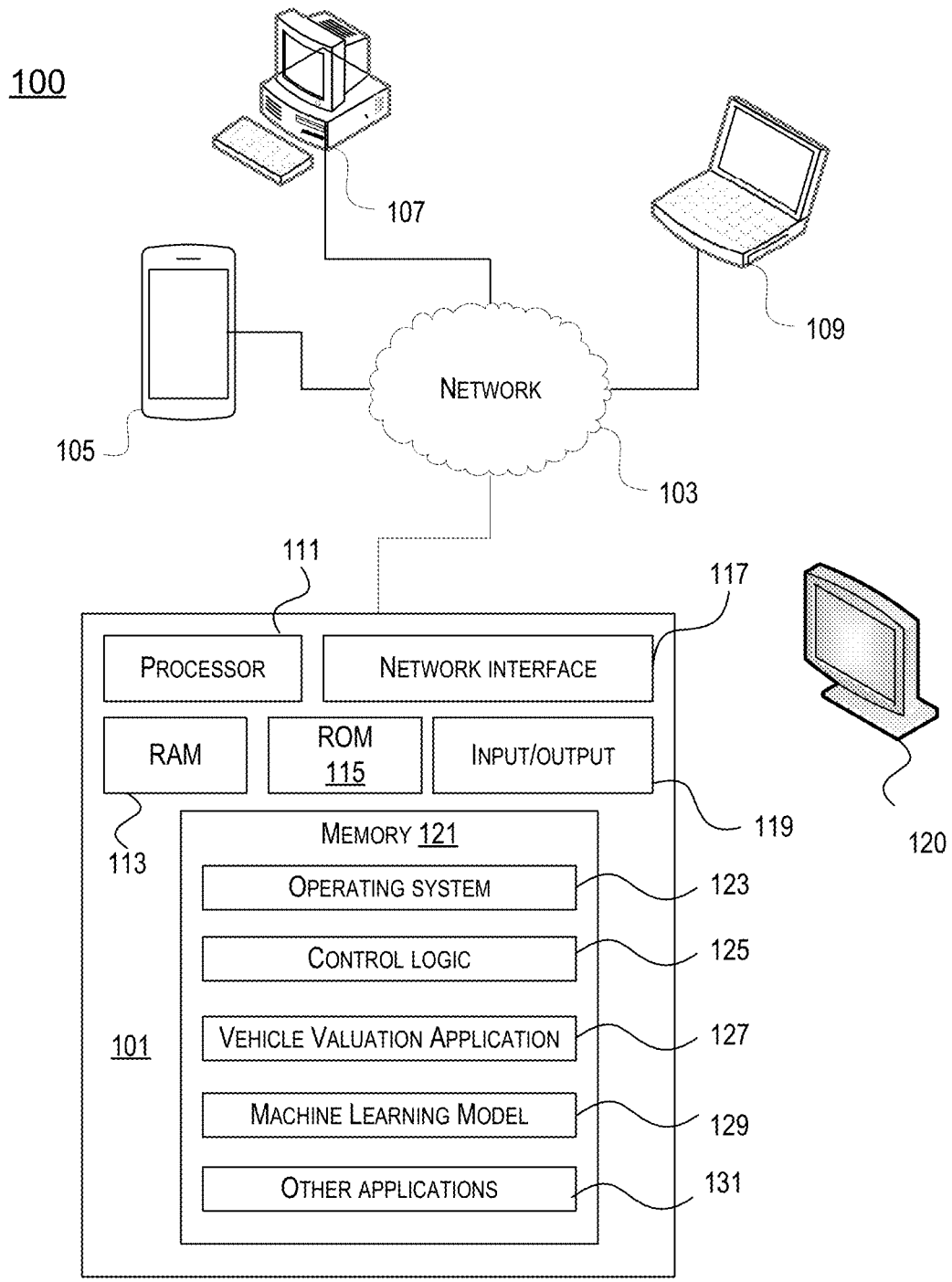
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to a vehicle valuation application operating on a vehicle valuation server, where the user is prompted to enter information about their vehicle and/or take pictures or videos of their vehicle that they would like to sell. The vehicle valuation application may execute a call for manufacturer data through a vehicle manufacturer application programming interface (API) and/or various manufacturer websites to determine the specifications of the vehicle and to determine if any of the components of the vehicle could be resold as individual components. The vehicle valuation application may set a threshold value. The threshold value may comprise a predetermined dollar amount. If the value of the vehicle component satisfies the predetermined dollar amount, then the vehicle resell application may consider the individual sale of the component. If the value of the vehicle component does not satisfy the predetermined dollar amount, the vehicle resell application may ignore reselling the individualized component. The vehicle valuation application may then take each component, and perform a second API call to various vehicle component reseller websites to determine the real-time value of the vehicle components. The vehicle valuation application may then tabulate and summarize the vehicle component resell information for the user to view.

When the information about the vehicle components is not available, the vehicle valuation application may prompt the vehicle owner to take images and/or videos of the vehicle. The vehicle valuation application may then utilize a machine learning model. The machine learning model may be one or more of a machine classifier, an image classifier, and/or a machine learning algorithm. The machine learning model may utilize one or more of a plurality of machine learning models including, but not limited to, decision trees, k-nearest neighbors, support vector machines (SVM), neural networks (NN), recurrent neural networks (RNN), convolutional neural networks (CNN), transformers, and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. The machine learning model may identify the various vehicle components within the images and/or videos. The machine learning model may also be a neural network model or a CNN machine learning model. Based on the machine learning model, the vehicle valuation application may then identify each vehicle component according to the images and/or videos and perform a search to determine the value of the components identified. For vehicles, generally, most of the information may be available regarding components for a specific vehicle make/model and year.

In another embodiment, a valuation application may be utilized for consumer products other than vehicles, such as appliances, motorcycles, lawnmowers, or electronics. For consumer products other than vehicles that people might want to sell, the valuation application may utilize a machine learning model. The machine learning model may be one or more of a machine classifier, image classifier, and/or a machine learning algorithm. The machine learning model may utilize one or more of a plurality of machine learning models including, but not limited to, decision trees, k-nearest neighbors, support vector machines (SVM), neural networks (NN), recurrent neural networks (RNN), convolutional neural networks (CNN), transformers, and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. The machine learning model may identify the various vehicle components within the images and/or videos. The machine learning model may also be a neural network or a CNN machine learning model. Once the components have been identified, the valuation application may verify this information against another resource, such as an instruction manual or component/parts diagram for the consumer product. The valuation application may then utilize the component/part information to identify the specific components and/or search for the resale pricing/estimates of these specific components for the consumer product.

A machine learning model may be utilized to identify and value the various vehicle components within images and/or videos of a vehicle and vehicle components. Based on the machine learning model, the vehicle valuation application may identify each vehicle component according to the images and/or videos and may perform a search for those identified vehicle components to determine the value of the identified vehicle components.

Before discussing these concepts in greater detail, however, several examples of a computing device that may be used in implementing and/or otherwise providing various aspects of the disclosure will first be discussed with respect to FIG. 1. While the below details are specific towards the resell of a vehicle and vehicle components, the systems and methods described and detailed in FIGS. 1, 2, 3A, and 3B may include systems and methods directed towards other consumer products, such as appliances, motorcycles, lawnmowers, or electronics.

FIG. 1 illustrates one example of a vehicle valuation server 101 as a computing device that may be used to implement one or more illustrative aspects discussed herein. For example, the vehicle valuation server 101 may, in some embodiments, implement one or more aspects of the disclosure by reading and/or executing instructions and performing one or more actions based on the instructions. In some embodiments, the vehicle valuation server 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The vehicle valuation server 101 may, in some embodiments, operate in a standalone environment. In others, the vehicle valuation server 101 may operate in a networked environment. As shown in FIG. 1, various devices 101, 105, 107, and 109 may be interconnected as network nodes via a network 103, such as the Internet. Other networks may also or alternatively be used, including private intranets, corporate networks, LANs, wireless networks, personal networks, and the like. Network 103 is for illustration purposes and may be replaced with fewer or additional computer networks. A local area network (LAN) may have one or more of any known network topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, the vehicle valuation server 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring the vehicle valuation server 101 into a special purpose computing device in order to perform one or more of the various functions discussed herein. Memory 121 may store operating system software 123 for controlling overall operation of the vehicle valuation server 101, control logic 125 for instructing the vehicle valuation server 101 to perform aspects discussed herein, a vehicle valuation application 127, a machine learning model 129, and other applications 131. The machine learning model 129 may be a machine classifier, an image classifier, and/or a machine learning algorithm. Control logic 125 may be incorporated in and may be a part of one or more of the vehicle valuation application 127 or the machine learning model 129. In several embodiments, the vehicle valuation server 101 may include two or more of any and/or all of these components (e.g., two or more processors, two or more memories, etc.) and/or other components and/or subsystems not illustrated here.

Devices 105, 107, 109 may have similar or different architecture as described with respect to the vehicle valuation server 101. Those of skill in the art will appreciate that the functionality of the vehicle valuation server 101 (or device 105, 107, 109) as described herein may be spread across multiple data processing devices, for example, to distribute processing load across multiple computers, to segregate transactions based on geographic location, user access level, quality of service (QoS), etc. For example, the vehicle valuation server 101 and devices 105, 107, 109, and others may operate in concert to provide parallel computing features in support of the operation of control logic 125 and/or the vehicle valuation application 127 or the machine learning model 129.

Figure 2:
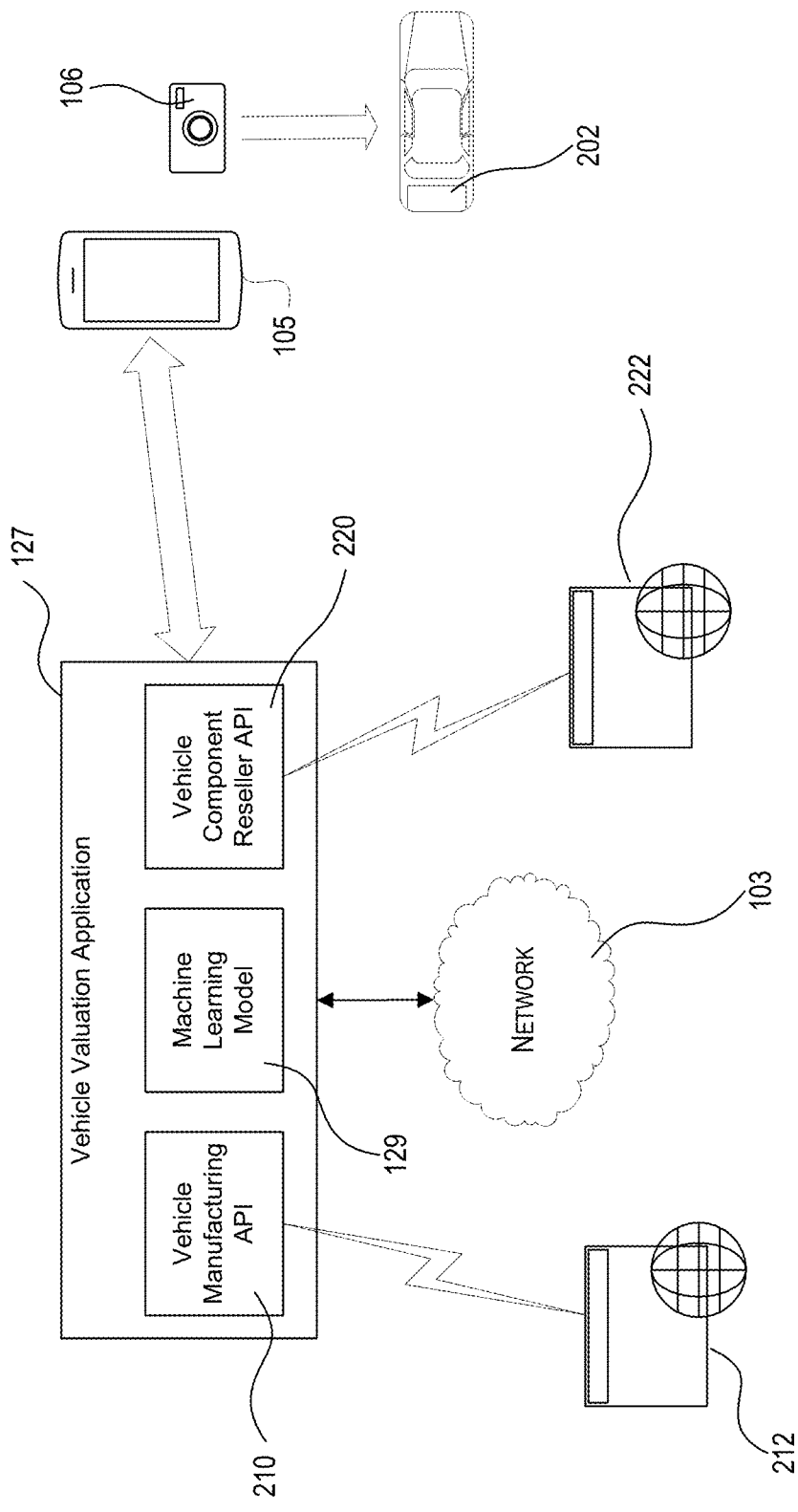
FIG. 2 depicts an example system with a vehicle valuation application that may be used in implementing one or more aspects of the disclosure in accordance with one or more illustrative aspects discussed herein.

FIG. 2 illustrates an exemplary system 200 system with a vehicle valuation application 127, machine learning model 129, and device 105 from FIG. 1. The vehicle valuation application 127 and device 105 may, in some embodiments, operate in a standalone environment. In many embodiments, the vehicle valuation application 127 and device 105 may operate in a networked environment. As shown in FIG. 2, the vehicle valuation application 127 and device 105 may be interconnected as network nodes via a network 103, such as the Internet. Other networks may also or alternatively be used, including private intranets, corporate networks, LANs, wireless networks, personal networks, and the like. Network 103 is for illustration purposes and may be replaced with fewer or additional computer networks. A local area network (LAN) may have one or more of any known network topologies and may use one or more of a variety of different protocols, such as Ethernet. The vehicle valuation application 127 and device 105 may be connected to one or more of the networks 103 via twisted pair wires, coaxial cable, fiber optics, radio waves or other communication media.

As illustrated in FIG. 2, a device 105 may comprise one or more processors, storage, and a vehicle valuation application 127 that are configured to execute a machine learning model 129. The device 105 may be one of various devices such as a desktop computer, a computer server, a mobile device (e.g., a laptop computer, a tablet computer, a smart phone, any other types of mobile computing devices, and the like), and/or any other type of data processing device. The device 105 may include a display with a user interface. Additionally, the device 105 may include one or more image capture devices or cameras 106 and storage to store images or videos from the one or more cameras 106. The images from cameras 106 may be processed by the vehicle valuation application 127 or the vehicle valuation server 101. The image capture devices may comprise still image cameras, video cameras, or a combination of still image cameras and video cameras. The camera 106 may be capable of capturing still images or pictures, capturing videos, or a combination of still images or pictures and videos of a vehicle 202 and/or components within the vehicle 202.

The vehicle valuation application 127 may utilize a machine learning model 129 for determining a resale value of the vehicle 202. The machine learning model 129 may provide data munging, parsing, and machine learning algorithms to determine a resale value of a vehicle. The machine learning model 129 may utilize one or more of a plurality of machine learning models including, but not limited to, decision trees, k-nearest neighbors, support vector machines (SVM), neural networks (NN), recurrent neural networks (RNN), convolutional neural networks (CNN), transformers, and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs.

As further illustrated in FIG. 2, the vehicle valuation application 127 may utilize and be connected via the network 103 to one or more application programming interfaces (APIs).

The vehicle valuation application 127 may include and execute a vehicle manufacturing API 210 that is connected to one or more vehicle manufacturing websites 212 via the network 103. The vehicle manufacturing API 210 may be a computing interface that defines interactions between multiple software intermediaries, such as the one or more vehicle manufacturing websites 212. The vehicle manufacturing API 210 may define calls and requests that can be made to the one or more vehicle manufacturing websites 212, how to make the calls and requests, the data formats that should be utilized for the calls and requests, and the conventions to follow for the calls and requests. The vehicle manufacturing API 210 may communicate with various APIs as part of the one or more vehicle manufacturing websites 212.

The vehicle valuation application 127 may include and execute a vehicle component reseller API 220 that is connected to one or more vehicle component reseller websites 222 via the network 103. The vehicle component reseller API 220 may be a computing interface that defines interactions between multiple software intermediaries, such as the one or more vehicle component reseller websites 222. The vehicle component reseller API 220 may define calls and requests that can be made to the one or more vehicle component reseller websites 222, how to make the calls and requests, the data formats that should be utilized for the calls and requests, and the conventions to follow for the calls and requests. The vehicle component reseller API 220 may communicate with various APIs as part of the one or more vehicle component reseller websites 222.

Specifically, the machine learning model 129 may be utilized for image processing and/or component identification with the vehicle valuation application 127. The machine learning model 127 may identify the components of the vehicle 202 and value the components, for example, based on information obtained via vehicle manufacturing API 210 and/or vehicle component reseller API 220. Specifically, the machine learning model 129 may train and be in communication with the vehicle manufacturing API 210 to identify the components of the vehicle 202. Similarly, the machine learning model 129 may be in communication with the vehicle component reseller API 220 to value the components of the vehicle 202. The vehicle valuation application 127 may not utilize a vehicle component database or a vehicle information database. Additionally, the vehicle valuation application 127 may not need to utilize a vehicle component database or a vehicle information database. Instead, the vehicle valuation application 127 may utilize the machine learning model 129 to request, predict, and/or process pertinent data via the vehicle manufacturing API 210 and the vehicle component reseller API 220 for a given vehicle.

Figure 3A:
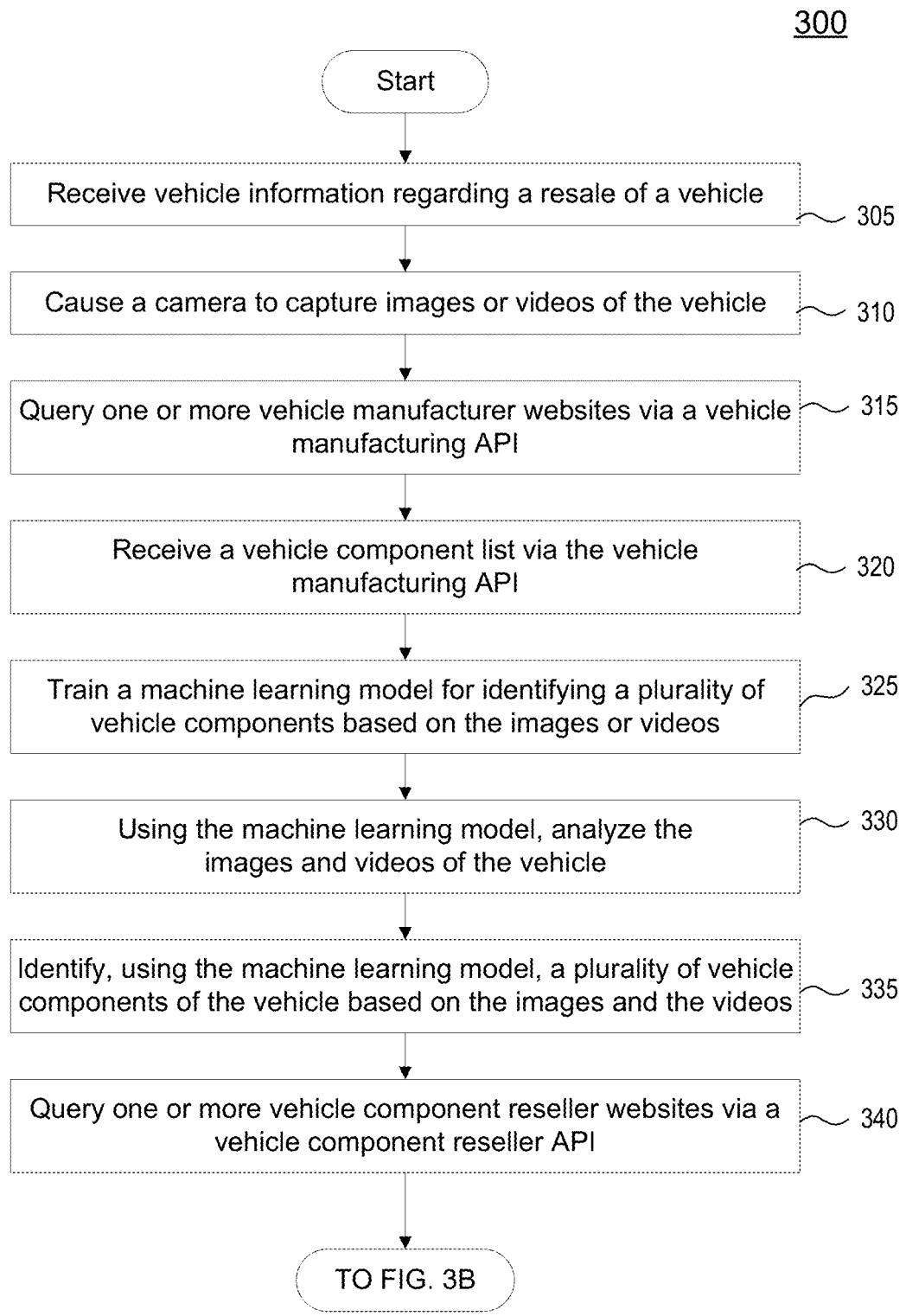
FIGS. 3A and 3B depict a flow chart for determining the resale value of a vehicle based on the components within the vehicle according to one or more aspects of the disclosure.
Figure 3B:
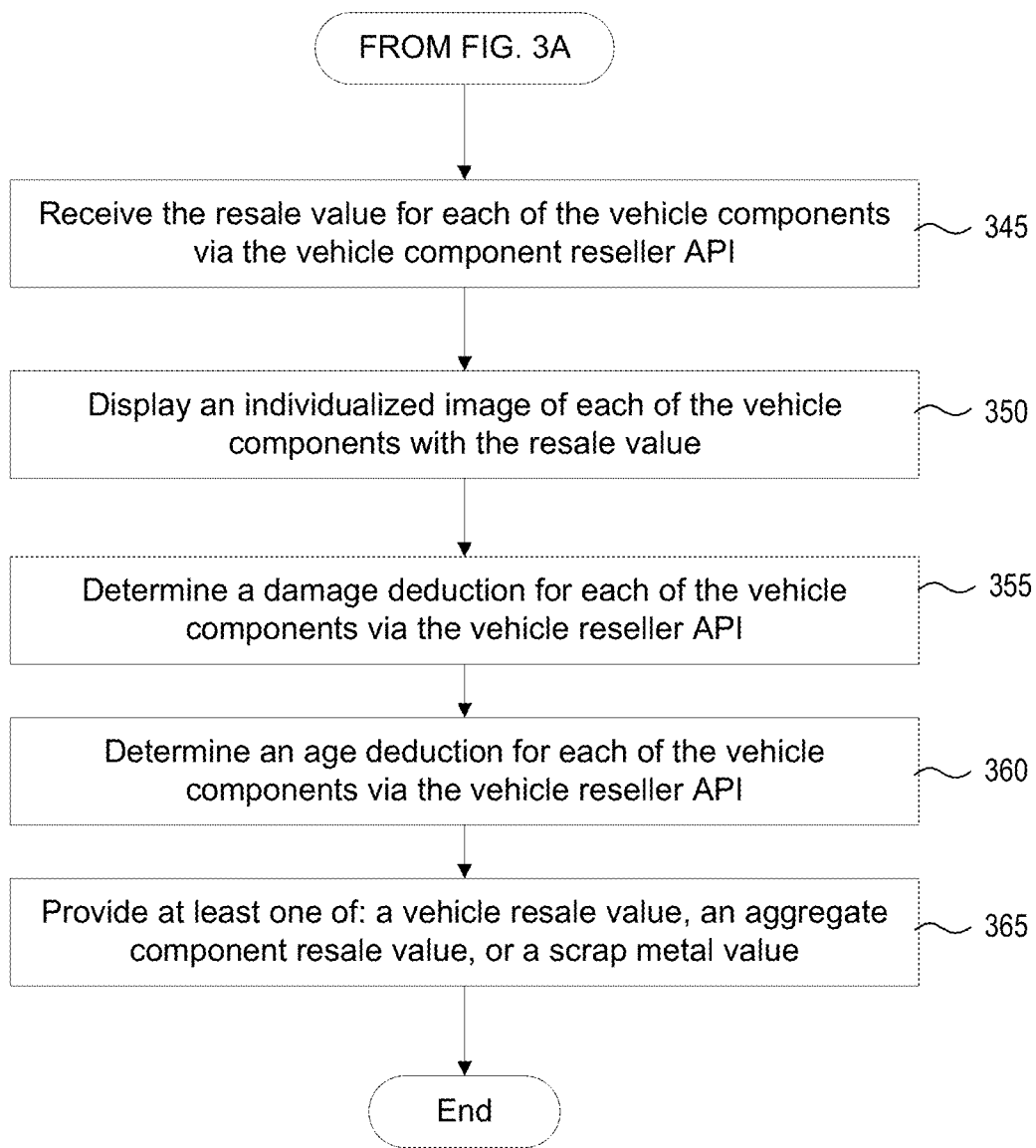

FIGS. 3A and 3B illustrate an example method 300 for image analysis and, more specifically, identifying individual components and elements in an image. Further, the method 300 may provide a method for determining a resale value of a vehicle and/or vehicle components. Method 300 may be implemented by a suitable computing system, as described further herein. For example, method 300 may be implemented by any suitable computing environment, by a computing device, and/or a combination of computing devices, such as the vehicle valuation server 101 and/or devices 105, 107, and 109 of FIG. 1. In a variety of embodiments, some or all of the steps described below may be combined and/or divided into sub-steps as appropriate. It will be readily appreciated that other steps may be included in this method, and that not all steps are necessary in all situations.

Specifically, FIGS. 3A and 3B illustrate an example method 300 for determining a resale value of a vehicle and/or vehicle components. At step 305, a computing device, or an application (e.g., the vehicle valuation application 127 and/or the vehicle valuation server 101) executing on the computing device, may receive vehicle information regarding a sale, or resale, of a vehicle. The vehicle valuation application 127 and/or the vehicle valuation server 101 may receive vehicle information from a user, for example, one or more inputs. The vehicle valuation application 127 may be accessed through various different mechanisms, such as operating on the vehicle valuation server 101 and/or one or more of the devices 105, 107, 109, or via a browser extension or website application on the internet operating on the vehicle valuation server 101 and/or one or more of the devices 105, 107, 109. A computing device or an application may receive the vehicle information from the user via a user interface on the device 105 executing on the vehicle application 127. The vehicle information may include one or more of: a vehicle make, a vehicle model, and/or a vehicle year. Additionally, during this step 305, a computing device or an application may cause a user interface to be displayed. A computing device or an application may also prompt via the user interface, the user to input the vehicle information regarding the resale of the vehicle.

At step 310, the vehicle valuation application 127 and/or the vehicle valuation server 101 may cause a camera 106 to capture images or videos of the vehicle. The camera 106 may capture the images or videos of the vehicle responsive to a user selection on the user interface. The vehicle valuation application 127 and/or the vehicle valuation server 101 via the user interface may direct or request the user to capture images or videos of the vehicle, and specifically various components of the vehicle. The vehicle valuation application 127 and/or the vehicle valuation server 101 via the user interface may direct or request the user to capture various angles of the vehicle, various angles of the vehicle components, or specific images or videos of specific components of the vehicle. The camera 106 may store the images or videos of the vehicle and/or the plurality of vehicle components. The camera 106 may send and transfer the images or videos of the vehicle and/or the plurality of vehicle components to the vehicle valuation application 127 and/or the vehicle valuation server 101. Additionally, the vehicle valuation application 127 and/or the vehicle valuation server 101 may prompt, via the user interface using the camera 106, the user to capture additional images or videos of one or more of the plurality of vehicle components based on a request for additional information. The user may take various images of the vehicle with various angles. The user may take various videos of the vehicle also. The user may utilize the user interface of the vehicle valuation application 127 and/or the vehicle valuation server 101 to take videos and/or images of the vehicle. The vehicle valuation application 127 and/or the vehicle valuation server 101 may parse the videos into specific images of the vehicle and/or the vehicle components.

At step 315, the vehicle valuation application 127 and/or the vehicle valuation server 101 may query one or more vehicle manufacturer websites via a vehicle manufacturing API. At step 320, the vehicle valuation application 127 and/or the vehicle valuation server 101 may receive the vehicle component list via the vehicle manufacturing API. The vehicle valuation application 127 and/or the vehicle valuation server 101 may determine, based on the response from the one or more vehicle manufacturer websites, a vehicle component list. The vehicle component list may include a plurality of vehicle components associated with the vehicle information.

At step 325, the vehicle valuation application 127 and/or the vehicle valuation server 101 may train a machine learning model 129 for identifying a plurality of vehicle components based on the images or videos. The machine learning model 129 may be a machine classifier, an image classifier, or a machine learning algorithm. The machine learning model 129 may utilize one or more of a plurality of machine learning models including, but not limited to, decision trees, k-nearest neighbors, support vector machines (SVM), neural networks (NN), recurrent neural networks (RNN), convolutional neural networks (CNN), transformers, and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs.

At step 330, the vehicle valuation application 127 and/or the vehicle valuation server 101 may analyze the images and/or videos using a machine learning model. The machine learning model may identify the plurality of vehicle components of the vehicle based on the images or videos of the vehicle and/or vehicle components.

At step 335, the machine learning model, through the vehicle valuation application 127 and/or the vehicle valuation server 101, may identify a plurality of vehicle components of the vehicle based on the images and/or the videos of the vehicle and/or vehicle components. The machine learning model may be configured to determine a pattern of the plurality of images or videos of the vehicle and/or vehicle components associated with the plurality of vehicle components of the vehicle. The pattern of the plurality of images or videos of the vehicle may indicate a potential correlation between the plurality of images or the videos of the vehicle and/or vehicle components and the one more plurality of vehicle components of the vehicle.

Additionally, the vehicle valuation application 127 and/or the vehicle valuation server 101 may analyze the images and/or videos in real-time or near real-time. The vehicle valuation application 127 and/or vehicle valuation server 101 may analyze and parse the images and/or videos to determine details of the various vehicles and/or vehicle components that the user may be selling. The vehicle valuation application 127 and/or vehicle valuation server 101 may identify the top selling vehicle components for a vehicle. The vehicle valuation application 127 may request the user take additional images of the top selling vehicle components to provide additional information to the vehicle valuation application 127 and/or machine learning model 129. Because the machine learning model 129 and vehicle manufacturer API 210 knows the various vehicle components as part of the vehicle, the vehicle valuation application 127 expects to see all of the required vehicle components of the vehicle.

At step 340, the vehicle valuation application 127 and/or the vehicle valuation server 101 may query one or more vehicle component reseller websites 222 via a vehicle component reseller API 220. The vehicle valuation application 127 and/or the vehicle valuation server 101 may determine, based on querying the one or more vehicle component reseller websites 222, a resale value for each of the plurality of vehicle components. Determining the resale value for each of the plurality of vehicle components may comprise obtaining real-time data from one or more vehicle component reseller websites 222 via the vehicle component reseller API 220.

At step 345, the vehicle valuation application 127 and/or the vehicle valuation server 101 may determine based on the response from the query a resale value for each of the vehicle components via the vehicle component reseller API 220. The resale value may be a real-time resale value for each of the plurality of vehicle components. The real-time resale value may include a minimum resale value for each of the vehicle components, a maximum resale value for each of the vehicle components, and/or an average resale value for each of the vehicle components. The vehicle valuation application 127 may set a threshold value. The threshold value may comprise a predetermined dollar amount. If the value of the vehicle component satisfies the predetermined dollar amount, then the vehicle resell application 127 may consider the individual sale of the component. If the value of the vehicle component does not satisfy the predetermined dollar amount, the vehicle resell application 127 may ignore reselling the individualized component. The vehicle component resale value may be a real-time resale value, for example, based on the current and/or specific resale information of the vehicle component at the time of the query via the vehicle component reseller API 220 to the vehicle component websites 221. The machine learning model 129 and/or the vehicle valuation application 127 may also provide an accuracy rating of the estimated values for the vehicle components. The vehicle valuation application 127 may utilize various vehicle manufacturer websites 212 for vehicle manufacturer APIs 210 and various vehicle and/or vehicle components reseller websites 222 for vehicle component reseller APIs 220 for tabulating this vehicle component resale value information. The vehicle valuation application 127 executing the machine learning model 129 with the various vehicle component reseller APIs 220 may not only look for individual vehicle component resale values, but also look for similar whole sets or component package deals that are pertinent to the consumer product and/or components. For example, the vehicle valuation application 127 may combine exhaust components for a package value for an exhaust system instead of just selling the individual exhaust components, such as the catalytic converter, etc. Similarly, the vehicle valuation application 127 may combine engine components for a package value for a vehicle engine instead of just selling the individual engine components, such as the pistons, etc.

At step 350, the vehicle valuation application 127 and/or the vehicle valuation server 101 may cause an individualized image of each of the vehicle components with the resale value or a real-time resale value to be displayed. Additionally, the vehicle valuation application 127 and/or the vehicle valuation server 101 may cause the individualized image of each of the vehicle components with the minimum resale value for each of the vehicle components, the maximum resale value for each of the vehicle components, and/or the average resale value for each of the vehicle components to be displayed via a user interface. The vehicle valuation application 127 and/or the vehicle valuation server 101 may display via the user interface a vehicle component resale value table that includes each of the plurality of vehicle components, the minimum resale value, the maximum resale value, and/or the average resale value associated with each of the plurality of vehicle components. The vehicle valuation application 127 may then output a table with categories and/or details for the vehicles and the vehicle components with the resale value. The resale value and/or table may include the real-time resale value, minimum resale value, maximum resale value, or average resale value.

At step 355, the vehicle valuation application 127 and/or the vehicle valuation server 101 may determine a damage deduction for each of the vehicle components via the vehicle reseller API. The vehicle valuation application 127 and/or the machine learning model 129 may provide information that components of the consumer product may not be sold "as is." The vehicle valuation application 127 may deduct from the resale value, for example, based on an analysis by the machine learning model 129 and/or the image processing and analysis based on the vehicle component wear and tear and/or potential damage.

At step 360, the vehicle valuation application 127 and/or the vehicle valuation server 101 may determine an age deduction for each of the vehicle components via the vehicle reseller API. The vehicle valuation application 127 and/or the CNN machine learning model 129 may provide information that components of the consumer product may not be sold "as is." The vehicle valuation application 127 may deduct from the resale value, for example, based on an analysis by the machine learning model 129 and/or the image processing and analysis based on the age of the vehicle component.

At step 365, the vehicle valuation application 127 and/or the vehicle valuation server 101 may provide at least one of: a vehicle resale value, a component resale value, or a scrap metal value for the vehicle. The vehicle resale value may be defined as a value for the vehicle for selling the vehicle to a dealership. The component resale value may be defined as an aggregate component resale value for selling all of the vehicle components to a vehicle parts shop. The scrap metal value may be defined as a value for selling the vehicle for scrap metal. The component resale value may be an aggregation of the real-time resale value for each of the plurality of vehicle components. The vehicle valuation application 127 may not only provide the resale valuation for the individual vehicle components of the vehicle, but the vehicle valuation application 127 may also provide alternate forms of selling and/or scrapping the vehicle. For example, the vehicle valuation application 127 may provide an estimated valuation, such as metal scrapping and metal pricing for scrapping the vehicle and selling the vehicle as metal. The vehicle valuation application 127 may provide a recommendation as to how to sell the vehicle, such as to a vehicle dealer as an entire vehicle, to a vehicle parts shop selling various vehicle components, or to a scrap metal shop.

In yet another embodiment, methods and systems may include a valuation application for a user that plans to sell a consumer product other than a vehicle, such as appliances, motorcycles, lawnmowers, or electronics. The valuation application may receive from the user various images of the consumer product with various angles. The valuation application may also receive from the user various videos of consumer products. The user may utilize the user interface of the valuation application to take videos and/or images. The valuation application may parse the videos into various images. The valuation application may also receive various information, such as the type of product, the kind of product, the manufacturer of the product, year of the product, etc.

The valuation application may train a machine learning model for identifying a plurality of components based on the images or videos of the consumer product. The machine learning model may be a machine classifier, an image classifier, or a machine learning algorithm. The machine learning model may utilize one or more of a plurality of machine learning models including, but not limited to, decision trees, k-nearest neighbors, support vector machines (SVM), neural networks (NN), recurrent neural networks (RNN), convolutional neural networks (CNN), transformers, and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. The valuation application may analyze the images and/or videos using a machine learning model. The machine learning model may identify the plurality of components of the consumer product based on the images or videos of the consumer product and/or components.

The valuation application may determine based on the response from the query a resale value for each of the components via a component reseller API. The resale value may be a real-time resale value for each of the plurality of components. The real-time resale value may include a minimum resale value for each of the components, a maximum resale value for each of the components, and/or an average resale value for each of the components. The component resale value may be a real-time resale value, for example, based on the current and/or specific resale information of the component at the time of the query via the component reseller API to the component websites. The machine learning model and/or the valuation application may also provide an accuracy rating of the estimated values for the components. The valuation application may utilize various manufacturer websites for manufacturer APIs and various component reseller websites for component reseller APIs for tabulating this component resale value information. The valuation application executing the machine learning model with the various component reseller APIs may not only look for individual component resale values, but also look for similar whole sets or component package deals that are pertinent to the consumer product and/or components.

The valuation application may then output a table with categories and/or details for the consumer products and/or the consumer product components with the resale value. The resale value and table may include the real-time resale value, minimum resale value, maximum resale value, and/or average resale value.

Additionally, the valuation application and the machine learning model may provide information that components of the consumer product may not be sold "as is." The valuation application may deduct from the resale value based on an analysis by the CNN machine learning model and the image processing and analysis of the component wear and tear, age, and potential damage.

Additionally, the valuation application and the CNN machine learning model may show individualized actual images (if available) of the components of the consumer product with a list and the resale value (minimum resale value, maximum resale value, and/or average resale value). The valuation application may not only provide the resale valuation for the individual components of the consumer product, but the valuation application may also provide alternate forms of selling and/or scrapping the consumer product. For example, the valuation application may provide an estimated valuation, such as metal scrapping and metal pricing for scrapping the consumer product and selling the product as metal. The valuation application may provide a recommendation as to how to sell the consumer product, such as to a dealer as a whole product, to a parts shop via various components, or to a scrap metal shop.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device comprising:
a display with a user interface;
a camera;
one or more processors; and
memory storing instructions that, when executed by the one or more processors, cause the computing device to:
receive a trained machine learning model trained, using training data, to identify, based on input images of one or more vehicles, one or more corresponding vehicle components and a predicted amount of wear associated with the one or more corresponding vehicle components;
receive, via the user interface and from a user, vehicle data comprising at least one of: a vehicle make, a vehicle model, or a vehicle year;
cause, responsive to a user selection on the user interface, the camera to capture one or more images of a vehicle at one or more first angles;
receive, via the camera, the one or more images of the vehicle;
provide, to the trained machine learning model, input data comprising the vehicle data and the one or more images of the vehicle;
receive, from the trained machine learning model, output comprising:
one or more indications of each of a plurality of vehicle components of the vehicle, and
one or more indications of a predicted amount of wear for each of the plurality of vehicle components;
based on the one or more indications of each of the plurality of vehicle components, display, via the user interface, a request to capture additional images of the plurality of vehicle components at one or more second angles different from the one or more first angles;
receive, via the camera and response to the request to capture additional images, the additional images;
transmit, via a vehicle component reseller application programming interface (API):
the one or more images of the vehicle,
the additional images,
the one or more indications of the predicted amount of wear for each of the plurality of vehicle components, and
the one or more indications of each of the plurality of vehicle components;
receive, via the API, a resale value for each of the plurality of vehicle components;
display, in the user interface and for each of the plurality of vehicle components;
at least one of the one or more images of the vehicle or the additional images, and
a corresponding resale value; and
further train the trained machine learning model based on the at least one of the one or more images of the vehicle or the additional images.

2. The computing device of claim 1, wherein the one or more images of the vehicle are part of one or more videos of the vehicle.

3. The computing device of claim 1, wherein the instructions, when executed by the one or more processors, cause the computing device to receive, via the API, the resale value for each of the plurality of vehicle components by causing the computing device to:
receive, via one or more vehicle manufacturer websites, the resale value for each of the plurality of vehicle components.

4. The computing device of claim 1, wherein the trained machine learning model comprises a convolutional neural network (CNN) model.

5. The computing device of claim 1, wherein the resale value includes at least one of: a minimum resale value, a maximum resale value, or an average resale value.

6. The computing device of claim 1, wherein the instructions, when executed by the one or more processors, cause the computing device to display the corresponding resale value by causing the computing device to display a comparison between the resale value and a scrap value.

7. The computing device of claim 1, wherein the instructions, when executed the one or more processors, cause the computing device to aggregate at least two of the plurality of vehicle components, wherein the instructions, when executed by the one or more processors, cause the computing device to display the corresponding resale value by causing the computing device to display a resale value corresponding to the aggregated at least two of the plurality of vehicle components.

8. The computing device of claim 1, wherein the instructions, when executed by the one or more processors, cause the computing device to receive the additional images by causing the computing device to capture
additional videos.

9. The computing device of claim 1, wherein the instructions, when executed by the one or more processors, cause the computing device to:
determine, via the vehicle component reseller API, a damage deduction for each of the plurality of vehicle components; and
display, in the user interface, the damage deduction.

10. The computing device of claim 1, wherein the instructions, when executed by the one or more processors, cause the computing device to:
determine, based on the one or more indications of the predicted amount of wear for each of the plurality of vehicle components, an age deduction for each of the plurality of vehicle components.

11. A computer-implemented method comprising:
receiving a trained machine learning model trained, using training data, to identify, based on input images of one or more vehicles, one or more corresponding vehicle components and a predicted amount of wear associated with the one or more corresponding vehicle components;
receiving, via a user interface and from a user, vehicle data comprising at least one of: a vehicle make, a vehicle model, or a vehicle year;
causing, responsive to a user selection on the user interface, a camera connected to a computing device to capture one or more images of a vehicle at one or more first angles;
receiving, via the camera, the of one or more images of the vehicle;
providing, to the trained machine learning model, input data comprising the vehicle data and the one or more images of the vehicle;
receiving, from the trained machine learning model, output comprising:
one or more indications of each of a plurality of vehicle components of the vehicle, and
one or more indications of a predicted amount of wear for each of the plurality of vehicle components;
based on the one or more indications of each of the plurality of vehicle components, displaying, via the user interface, a request to capture additional images of the plurality of vehicle components at one or more second angles different from the one or more first angles;
receiving, via the camera and response to the request to capture additional images, the additional images;
transmitting, via a vehicle component reseller application programming interface (API):
the one or more images of the vehicle,
the additional images,
the one or more indications of the predicted amount of wear for each of the plurality of vehicle components, and
the one or more indications of each of the plurality of vehicle components;
receiving, via the API, a resale value for each of the plurality of vehicle components;
causing display, in the user interface and for each of the plurality of vehicle components;
at least one of the one or more images of the vehicle or the additional images, and
a corresponding resale value; and
further training the trained machine learning model based on the at least one of the one or more images of the vehicle or the additional images.

12. The method of claim 11, wherein the one or more images of the vehicle are part of one or more videos of the vehicle.

13. The method of claim 11, wherein the receiving the resale value comprises receiving, via one or more vehicle manufacturer websites, the resale value for
each of the plurality of vehicle components.

14. The method of claim 11, wherein the receiving the additional images comprises capturing
additional videos.

15. The method of claim 11, further comprising:
determining, via the vehicle component reseller API, a damage deduction for each of the plurality of vehicle components; and
displaying, in the user interface, the damage deduction.

16. The method of claim 11, further comprising:
determining, via the vehicle component reseller API, an age deduction for each of the plurality of vehicle components; and
displaying, in the user interface, the age deduction.

17. One or more non-transitory media storing instructions that, when executed by one or more processors, cause a computing device to perform steps comprising:
receiving a trained machine learning model trained, using training data, to identify, based on input images of one or more vehicles, one or more corresponding vehicle components and a predicted amount of wear associated with the one or more corresponding vehicle components;
receiving, via a user interface and from a user, vehicle data comprising at least one of: a vehicle make, a vehicle model, and a vehicle year;
causing, responsive to a user selection on the user interface, a camera on the computing device to capture one or more images of a vehicle at one or more first angles;
receiving, via the camera, the one or more images of the vehicle;
providing, to the trained machine learning model, input data comprising the vehicle data and the one or more images of the vehicle;
receiving, from the trained machine learning model, output comprising:

one or more indications of each of a plurality of vehicle components of the vehicle, and
one or more indications of a predicted amount of wear for each of the plurality of vehicle components;
based on the one or more indications of each of the plurality of vehicle components, displaying, via the user interface, a request to capture additional images of the plurality of vehicle components at one or more second angles different from the one or more first angles;
receiving, via the camera and response to the request to capture additional images, the additional images;
transmitting, via a vehicle component reseller application programming interface (API):
the one or more images of the vehicle,
the additional images,
the one or more indications of the predicted amount of wear for each of the plurality of vehicle components, and
the one or more indications of each of the plurality of vehicle components;
receiving, via the API, a resale value for each of the plurality of vehicle components;
displaying, in the user interface and for each of the plurality of vehicle components:
at least one of the one or more images of the vehicle or the additional images, and
a corresponding resale value;
and
further training the trained machine learning model based on the at least one of the one or more images of the vehicle or the additional images.

18. The one or more non-transitory media of claim 17, wherein the one or more images of the vehicle are part of one or more videos of the vehicle.

19. The one or more non-transitory media of claim 17, wherein the instructions, when executed by the one or more processors, further cause the computing device to perform steps comprising:
determining, via the vehicle component reseller API, a damage deduction for each of the plurality of vehicle components; and
displaying, in the user interface, the damage deduction.

20. The one or more non-transitory media of claim 17, wherein the instructions, when executed by the one or more processors, further cause the computing device to perform steps comprising:
determining, via the vehicle component reseller API, an age deduction for each of the plurality of vehicle components; and
displaying, in the user interface, the age deduction.

* * * * *